Patented Sept. 20, 1932

1,878,543

UNITED STATES PATENT OFFICE

EUGEN RIMELE, EUGEN GLIETENBERG, AND WILHELM NEELMEIER, OF LEVERKUSEN-ON-THE-RHINE, GERMANY, ASSIGNORS TO GENERAL ANILINE WORKS, INC., OF NEW YORK, N. Y., A CORPORATION OF DELAWARE

MONOAROYLDIAMINES OF THE BENZENE SERIES

No Drawing. Application filed December 5, 1930, Serial No. 500,417, and in Germany December 23, 1929.

The present invention relates to a process of preparing monoaroyl-diamines of the benzene series and to the new products obtainable thereby, more particularly it relates to compounds of the general formula:

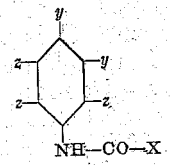

wherein X stands for aryl or aralkyl, one $y$ stands for an amino group and the other $y$ and the $z$'s stand for hydrogen, halogen, alkyl or oxalkyl.

The manufacture of monoaroylphenylene-diamines by reduction of aroylated nitranilines is known. In consequence of the sparing solubility of the aroylated nitranilines and of the reduction products in water and in the customary organic solvents, such as alcohol, benzene and the like the process presents technical difficulties in many cases.

In accordance with the present invention monoaroylphenylene-diamines of the above general formula are produced in a smooth reaction by aroylating or alkaroylating in the usual manner the amino group of a 1-amino-3- or 4-arylsulfamido benzene which may be represented by the general formula:—

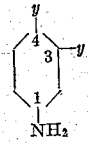

one $y$ meaning the group —NH—SO$_2$—aryl, the other $y$ meaning hydrogen, halogen, alkyl or oxalkyl and wherein the benzene nucleus may be further substituted by halogen, alkyl or oxalkyl, by treating the same with an aromatic-aliphatic carboxylic acid halide in aqueous solution in the presence of an acid binding agent.

The starting amino-arylsulfamido benzenes are obtainable according to known methods by reacting upon a 4-nitro-1-or 2-amino-benzene which may be otherwise substituted by halogen, alkyl or oxalkyl with an aromatic sulfonic acid halide, such as, benzene sulfonic acid chloride or para-toluene-sulfonic acid chloride in aqueous solution in the presence of an acid binding agent, and reducing the nitro group to form the amino group, for example, by means of iron and hydrochloric or acetic acid.

From the aryl sulfonic compounds of the formula:—

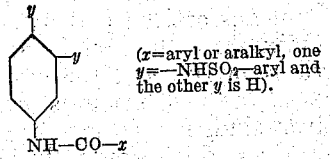

($x$=aryl or aralkyl, one $y$=—NHSO$_2$—aryl and the other $y$ is H).

the aryl sulfonic acid group is split off by introducing the compound into concentrated sulfuric acid of room temperature and allowing the sulfuric acid to act upon the compound for several hours, whereby the aroyl-amino group is not attacked.

The whole process may be represented by the following scheme:

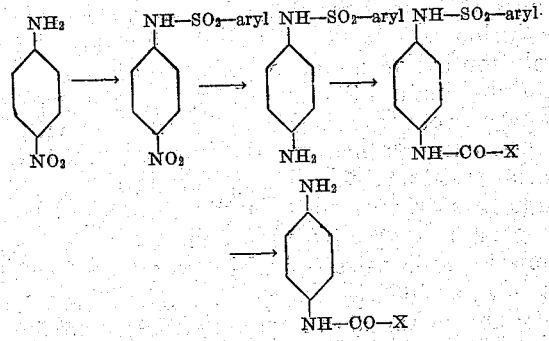

The process described also renders possible in many cases the manufacture of bases, which in consequence of the difficulty of obtaining the nitroamino compounds could only be produced by other methods in a tedious or cumbersome manner. Thus the monoaroyl-phenylene-diamines heretofore unknown of the formula:—

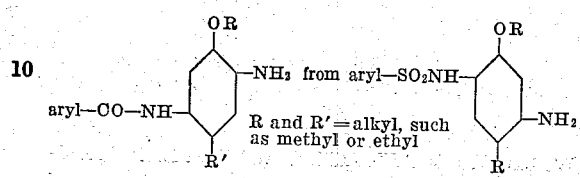

were only to be obtained from the nitroamine of the formula:

being only accessible with difficulty.

The new compounds thus obtainable are generally white to yellowish colored crystalline substances and are valuable intermediate products in the manufacture of azo dyestuffs.

The following examples will illustrate the invention without restricting it thereto:

*Example 1*

(a) 322 kgs. of the 5-nitro-4-methyl-2-phenyl-sulfamido-1-methoxybenzene, melting at 207–208° C., obtainable in accordance with Brit. specification No. 6741/1904, are reduced by means of iron and hydrochloric acid. The mixture is then rendered alkaline with caustic soda lye, and the amino compound, present in the solution, is pressed out from the iron sludge. 160 kgs. of benzoylchloride are then added gradually to the filtrate at 30–40° C. with thorough stirring whereupon the benzoyl compound formed precipitates. This is filtered by suction, washed with water and dried. The melting point is 168–171° C.

396 kgs. of the 5-benzoylamino-4-methyl-2-phenyl-sulfamido-1-methoxybenzene thus produced are introduced at 20–30° C. into 3.5 times the quantity of 66° Bé. sulfuric acid. Solution occurs. On the following day the solution is poured on to ice. The 5-benzoylamino-4-methyl-2-amino-1-methoxybenzene separates out as the sulfate. It is filtered with suction and washed with sodium chloride solution until neutral. The sulfate is dissolved in hot water, pressed through a filter and the free base is precipitated with sodium carbonate. It consists of white small needles, melting at 185° C.

When in the above example instead of 5-nitro-4-methyl-2-phenylsulfamido-1-methoxybenzene the 5-nitro-4-methyl-2-phenylsulfamido-1-ethoxybenzene (melting at 175° C.) is reduced in the customary manner by means of iron and hydrochloric acid and the solution after being rendered alkaline with caustic soda and filtering from iron is benzoylated in the manner above described, the 5-benzoylamino-4-methyl-2-phenylsulfamido-1-ethoxybenzene, melting at 148° C. is obtained.

When the latter substance is introduced into four parts of 66° Bé. sulfuric acid, allowed to stand for 24 hours and then poured on to ice, the sulfate of the 5-benzoylamino-4-methyl-2-amino-1-ethoxybenzene separates out. By dissolving in hot water, filtering and precipitating with sodium carbonate, the free base is obtained, melting at 158° C.

The sulfate of the benzoylamino-4-methyl-2-amino-phenylbutylether (melting point of the base 120° C.) is obtained by reduction, subsequent benzoylation and splitting up with concentrated sulfuric acid of the 5 nitro-4-methyl-2-phenylsulfamido-phenylbutylether of the melting point 134° C.

(b) The 5-(2'.4'-dichlorobenzoylamino)-4-methyl-2-phenylsulfamido-1-methoxybenzene, melting at 203° C. is obtained by condensing the sodium salt of the 5-amino-4-methyl-2-phenylsulfamido-1-methoxybenzene with 230 kgs. of dichlorobenzoylchloride instead of with 160 kgs. of benzoylchloride.

By splitting up with concentrated sulfuric acid as described under (a), paragraph 2 of this example, there is obtained the sulfate of the 5-(2'.4'-dichlorobenzoylamino)-4-methyl-2-amino-1-methoxybenzene. On precipitating with ammonia the free base of the formula:—

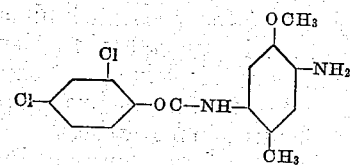

melting at 160° C. is obtained.

On using instead of benzoylchloride the 4-methoxybenzoylchloride and decomposing the condensation product with sulfuric acid, the sulfate of 5-(4'-methoxy-benzoylamino)-4-methyl-2-amino-1-methoxybenzene, melting at 212° C., is obtained.

The phenylacetic acid chloride yields on condensing with 5-amino-4-methyl-2-phenyl-sulfamido-1-methoxybenzene the 5-phenyl-acetylamino-4-methyl-2-phenylsulfamido-1-methoxybenzene of the melting point 183° C. On heating this mixture for a short time with 4 parts of concentrated sulfuric acid, there is obtained the sulfate of the 5-phenyl-acetylamino-4-methyl-2-amino-1-methoxybenzene. The free base has the melting point 158° C.

2-chloro-phenoxy acetic acid chloride yields, when condensed with 5-amino-4-methyl-2-phenylsulfamido-1-methoxybenzene, the 2-chlorophenoxyacetyl compound of the melting point 196° C., and by treating this compound with concentrated sulfuric acid, the 5-(2'-chlorophenoxyacetylamino)-4-methyl-2-amino-1-methoxybenzene, melting at 135° C., is obtained.

The 5-cinnamoylamido-4-methyl-2-phenylsulfamido-1-methoxybenzene, melting at 198° C., is obtained by condensing cinnamic acid chloride with 5-amino-4-methyl-2-phenylsulfamido-1-methoxybenzene. On heating the compound thus obtained with concentrated sulfuric acid, the 5-cinnamoylamino-4-methyl-2-amino-1-methoxybenzene results.

*Example 2*

356.5 kgs. of the 5-nitro-4-chloro-2-tolylsulfamido-1-methoxybenzene, melting at 170° C., produced in accordance with Brit. Spec. No. 6741/1904, are reduced by means of iron and formic acid and after rendering alkaline with caustic soda and separating from the iron, the amino compound is treated with 160 kgs. of benzoyl chloride at 25–30° C. with thorough stirring. The condensation product separates out after some time. It is filtered by suction, washed and dried. The melting point is 175° C.

100 kgs. of 5-benzoylamino-4-chloro-2-tolylsulfamido-1-methoxybenzene are introduced at room temperature into 400 kgs. of 98% sulfuric acid, allowed to stand for 24 hours, after which the solution is poured into ice water. The sulfate of the 5-benzoylamino-4-chloro-2-amino-1-methoxybenzene separates out and is filtered with suction and washed with salt solution. It is dissolved in hot water and after filtration the base of the formula:

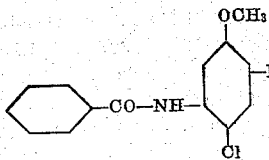

is precipitated with ammonia. It forms small snow white needles, melting at 174° C.

*Example 3*

306 kgs. of 2-methyl-4-nitro-1-tolylsulfamidobenzene are reduced in the customary manner by means of iron and hydrochloric acid. When the reduction is complete, the mixture is rendered alkaline with caustic soda and filtered from the iron sludge. 141 kgs. of benzoyl chloride are introduced slowly into the filtrate at 30–40° C. while stirring. The benzoyl compound precipitates and is filtered by suction and dried. The melting point is 195° C.

100 kgs. of the latter compound are introduced into 400 kgs. of 98% sulfuric acid and allowed to stand for 1–2 days, when the solution is poured on to ice. The sulfate of the 2-methyl-4-benzoylphenylenediamine separates out. It is dissolved in hot water and after the addition of sodium carbonate the free base of the formula:

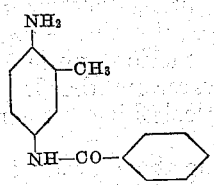

is obtained. It forms white needles, melting at 154° C.

*Example 4*

166 kgs. of 6-nitro-4-amino-1.3-dimethylbenzene are dissolved at 60° C., in an equal quantity of pyridine and 177 kgs. of benzene sulfochloride are added between 60 and 100° C. while stirring. After further stirring for one half to one hour 300 kgs. of water are added and the phenylsulfamido-nitro-xylene, which crystallizes out, is filtered by suction, washed with a little water and dried. The melting point is 148° C.

306 kgs. of the above product are reduced in the customary manner in 2000 liters of water by means of 300 kgs. of iron and 20 kgs. of hydrochloric acid. After rendering alkaline with caustic soda lye and separating from the iron by pressing, 141 kgs. of benzoyl chloride are stirred into the liquor. The benzoyl compound, which separates, is filtered by suction and dried.

100 kgs. of the latter compound are introduced into 400 kgs. of 66° Bé. sulfuric acid. The solution is heated to about 60° C. and this temperature is maintained for about 1–2 hours. The solution is then poured on to ice, whereupon the 6-benzoylamino-4-amino-1.3-dimethylbenzene of the formula:

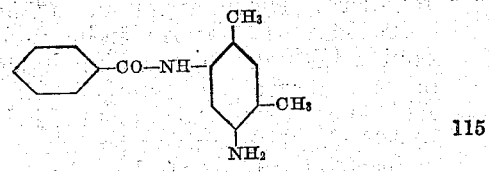

separates as the sulfate. This is dissolved in hot water, filtered and the base is precipitated with sodium carbonate. It forms white needles, melting at 176° C.

*Example 5*

168 kgs. of 4-nitro-2-anisidine are dissolved in 336 kgs. pyridine and 191 kgs. paratoluene-sulfochloride are added at 60–80° C. After about one half hour the solution is diluted with 200 liters of water, and the toluenesulfo compound which crystalizes out is filtered by suction and washed until neutral. The melting point is 194° C.

The 4-nitro-2-tolylsulfamido-1-methoxybenzene thus obtained is reduced in hot water by means of iron and hydrochloric acid. After rendering alkaline with caustic soda lye and separating from the iron sludge by pressing, 141 kgs. of benzoylchloride are slowly dropped into the liquor at 20–30° C., whereby the 4-benzoylamino-2-tolylsulfamido-1-methoxybenzene separates out. The reaction mass is filtered by suction while still alkaline, washed with water and dried. When recrystallized from alcohol it has the melting point 183° C.

100 kgs. of the above product are dissolved at room temperature in 350 kgs. of sulfuric acid of 96° Bé. and allowed to stand for one day. The solution is poured on to ice and the product which separates is filtered by suction. The solution is re-dissolved in hot water, filtered and from the filtrate there is precipitated with sodium carbonate the 4-benzoylamino-2-amino-1-methoxybenzene of the formula:—

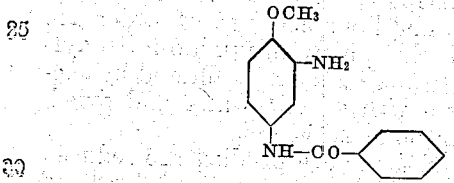

of the melting point 139° C.

*Example 6*

(a) 339 kgs. of 5-nitro-2-phenylsulfamido-1.4-hydroquinone-dimethylether of the melting point 198° C., obtained in accordance with Brit. Spec. No. 6741/1904, are reduced in the customary manner with iron and acetic acid. After rendering alkaline with caustic soda lye and separating from the iron sludge by suction, 150 kgs. of benzoylchloride are added to the liquor while thoroughly stirring, whereby the benzoyl compound separates. It is filtered by suction while still alkaline and dried. The melting point is 175° C.

100 kgs. of 5-benzoylamino-2-phenylsulfamido-1.4-hydroquinone-dimethylether are introduced into 400 kgs. of 66° Bé. sulfuric acid and stirred for about 24 hours at 20–30° C. The solution is then poured on to ice; the sulfate of the 5-benzoylamino-2-amino-1.4-hydroquinone-dimethylether which separates is filtered by suction and washed with a solution of common salt. After re-dissolving in hot water the base is filtered and precipitated with sodium carbonate. It forms white needles, melting at 168° C.

(b) By treating the 5-nitro-2-phenylsulfamido-1.4-hydroquinone-diethylether in the same manner as described under a) of this example, there is obtained as end product the 5-benzoylamino-2-amino-1.4-hydro-quinone-diethylether of the melting point 101° C.

(c) When the 5-nitro-2-amino-4-methoxy-1-ethoxybenzene (prepared in accordance with German Pat. No. 141,975) is condensed with benzenesulfochloride in pyridine, and the benzenesulfo compound thus obtained is reduced in the same manner as described under a) of this example, the 5-benzoylamino-2-amino-4-methoxy-1-ethoxybenzene of the formula:

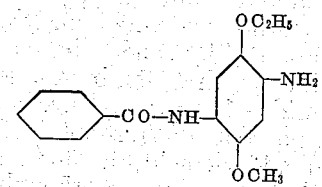

of the melting point 121° C. results after benzoylating and splitting off the benzenesulfo residue.

We claim:—

1. The process which comprises acylating a 1-amino-benzene which is substituted in one of the positions 3 and 4 by the group —NH—SO$_2$—aryl and which may be further substituted by substituents of the groups consisting of alkyl, oxalkyl and halogen with an acid halide of an organic acid of the group consisting of carboxylic acids of the aromatic and aromatic-aliphatic series and reacting upon the aminoacyl compound formed with concentrated sulfuric acid at room temperature for several hours.

2. The process which comprises acylating a 1-amino-benzene which is substituted in one of the positions 3 and 4 by the groups —NH—SO$_2$—C$_6$H$_5$ and which may be further substituted by substituents of the groups consisting of alkyl, oxalkyl and halogen with an acid chloride of an organic acid of the group consisting of carboxylic acids of the aromatic and aromatic-aliphatic series and reacting upon the acylamino compound formed with concentrated sulfuric acid at room temperature for several hours.

3. The process which comprises acylating a 1-amino-benzene which is substituted in one of the positions 3 and 4 by the group —NH—SO$_2$—aryl and which may be further substituted by an alkyl and oxalkyl group with an acid halide of an organic acid of the group consisting of carboxylic acids of the aromatic and aromatic-aliphatic series and reacting upon the acylamino compound formed with concentrated sulfuric acid at room temperature for several hours.

4. The process which comprises acylating a 1-amino-benzene which is substituted in one of the positions 3 and 4 by the groups —NH—SO$_2$—aryl and which may be further substituted by an alkyl and oxalkyl group with an acid chloride of an organic acid of the group consisting of carboxylic acids of the aromatic and aromatic-aliphatic series and reacting upon the acylamino compound formed with concentrated sulfuric acid at room temperature for several hours.

5. The process which comprises benzoylating a 1-amino-benzene which is substituted in one of the positions 3 and 4 by the group —NH—SO$_2$—C$_6$H$_5$ and which may be further substituted by substituents of the group consisting of alkyl, oxalkyl and halogen and reacting upon the benzoylamino compound formed with concentrated sulfuric acid at room temperature for several hours.

6. The process which comprises benzoylating a 1-amino-benzene which is substituted in one of the positions 3 and 4 by the group —NH—SO$_2$—C$_6$H$_5$ and which is further substituted by an alkyl and oxalkyl group and reacting upon the benzoylamino compound formed with concentrated sulfuric acid at room temperature for several hours.

7. The process which comprises benzoylating 5-amino-4-methyl-2-phenylsulfamido-1-methoxybenzene with 2.4-dichlorobenzoylchloride and treating the 2'.4'dichlorobenzoylamino compound formed with concentrated sulfuric acid at room temperature for several hours.

8. As new products monoaroylphenylenediamines of the general formula:—

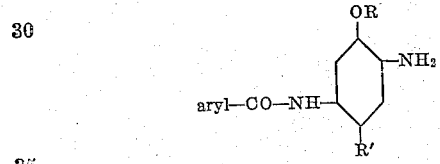

wherein R and R' stand for alkyl, being generally white to yellowish colored crystalline substances which are valuable intermediate products in the manufacture of azo dyestuffs.

9. As new products monoaroylphenylenediamines of the general formula:

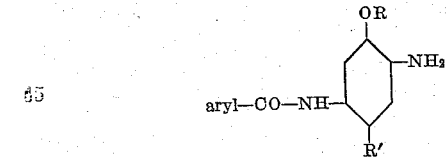

wherein R and R' stand for alkyl groups from 1 to 2 carbon atoms, being generally white to yellowish colored crystalline substances which are valuable intermediate products in the manufacture of azo dyestuffs.

10. As a new product the compound of the formula:

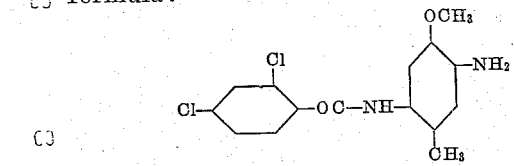

being a yellowish crystalline substance of the melting point 212° C. and being a valuable intermediate product in the manufacture of azo dyestuffs.

In testimony whereof, we affix our signatures.

EUGEN RIMELE.
EUGEN GLIETENBERG.
WILHELM NEELMEIER.